US008209372B2

(12) United States Patent
Abdo et al.

(10) Patent No.: US 8,209,372 B2
(45) Date of Patent: Jun. 26, 2012

(54) BITMAP TRANSFER-BASED DISPLAY REMOTING

(75) Inventors: Nadim Y. Abdo, Bellevue, WA (US); Wilhelm R. Schmieder, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/149,010

(22) Filed: May 31, 2011

(65) Prior Publication Data

US 2011/0227935 A1 Sep. 22, 2011

Related U.S. Application Data

(62) Division of application No. 11/756,284, filed on May 31, 2007.

(51) Int. Cl.
G06F 15/16 (2006.01)

(52) U.S. Cl. ..................... 709/200; 709/217

(58) Field of Classification Search .................. 709/200, 709/203, 208, 217–219, 226–227
See application file for complete search history.

(56) References Cited

U.S. PATENT DOCUMENTS

| | | | | |
|---|---|---|---|---|
| 5,043,919 A * | 8/1991 | Callaway et al. | ............. | 715/733 |
| 5,381,347 A * | 1/1995 | Gery | .............................. | 345/548 |
| 5,491,780 A * | 2/1996 | Fyles et al. | ..................... | 715/733 |
| 5,581,670 A * | 12/1996 | Bier et al. | ...................... | 715/856 |
| 5,673,401 A * | 9/1997 | Volk et al. | ...................... | 725/139 |
| 5,734,387 A * | 3/1998 | Patrick et al. | ................. | 345/441 |
| 5,819,042 A * | 10/1998 | Hansen | .......................... | 709/222 |
| 6,016,520 A | 1/2000 | Facq et al. | | |
| 6,084,600 A | 7/2000 | Munshi | | |
| 6,317,115 B1 * | 11/2001 | Yokomizo | ..................... | 345/685 |
| 6,437,803 B1 | 8/2002 | Panasyuk et al. | | |
| 6,462,746 B1 * | 10/2002 | Min et al. | ...................... | 345/545 |
| 6,463,459 B1 | 10/2002 | Orr et al. | | |
| 6,697,942 B1 | 2/2004 | L'Heureux et al. | | |
| 6,772,204 B1 * | 8/2004 | Hansen | ......................... | 709/220 |

(Continued)

FOREIGN PATENT DOCUMENTS

CN 101681339 3/2010

(Continued)

OTHER PUBLICATIONS

Anonymous, "Virtual Network Computing", Wikipedia, May 18, 2007, retrieved from the internet on Nov. 30, 2010 at http://en.wikipedia.org/w/index.php?title=Virtual_Network_Computing &oldid=131687736.

(Continued)

*Primary Examiner* — Faruk Hamza
(74) *Attorney, Agent, or Firm* — Lee & Hayes, PLLC

(57) ABSTRACT

A bitmap transfer-based display remoting by a server coupled to a client is described. Specifically, an application executing on the server implements operations to render a portion of a graphical user interface (GUI). The server decomposes corresponding rendering-based command(s) into simple bitmap raster operations commands. The server sends the bitmap-based commands to the client. The client, responsive to receiving the commands, respectively stores and draws bitmaps from an offscreen display surface, as directed by the server, to an onscreen display surface to present the GUI portion to a user. Logic at the client to store and present the GUI portion are independent of any client-implemented display remoting cache management logic. The client operations are also independent of determinations and processing of graphical object semantics beyond bitmap semantics. Such management and semantic determinations and processing are implemented and maintained respectively at and by the server.

20 Claims, 7 Drawing Sheets

U.S. PATENT DOCUMENTS

| | | |
|---|---|---|
| 7,103,428 B2 | 9/2006 | Varone et al. |
| 7,171,444 B2 | 1/2007 | Deshpande |
| 7,430,681 B1 | 9/2008 | Hobbs |
| 7,447,997 B2 | 11/2008 | Colle |
| 7,765,483 B2 * | 7/2010 | Schmieder et al. ........... 715/751 |
| 2002/0026502 A1 | 2/2002 | Phillips et al. |
| 2003/0177172 A1 | 9/2003 | Duursma et al. |
| 2005/0022131 A1 | 1/2005 | Saint-Hilaire et al. |
| 2005/0198189 A1 | 9/2005 | Robinson et al. |
| 2005/0210151 A1 | 9/2005 | Abdo et al. |
| 2005/0267972 A1 | 12/2005 | Costa-Requena et al. |
| 2006/0037054 A1 | 2/2006 | McDowell et al. |
| 2006/0069797 A1 | 3/2006 | Abdo et al. |
| 2006/0082583 A1 | 4/2006 | Leichtling et al. |
| 2006/0142878 A1 | 6/2006 | Banik et al. |
| 2006/0203007 A1 | 9/2006 | Bullard et al. |
| 2006/0230105 A1 | 10/2006 | Shappir et al. |
| 2006/0282855 A1 | 12/2006 | Margulis |
| 2007/0046980 A1 | 3/2007 | Coleman et al. |
| 2007/0156689 A1 | 7/2007 | Meek et al. |
| 2007/0279418 A1 * | 12/2007 | Carter-Schwendler et al. ..................... 345/469.1 |
| 2008/0301566 A1 | 12/2008 | Abdo et al. |
| 2010/0241694 A1 * | 9/2010 | Jensen et al. ................. 709/203 |

FOREIGN PATENT DOCUMENTS

| | | |
|---|---|---|
| EP | 2171606 | 4/2010 |
| JP | 2001028763 | 1/2001 |
| JP | 2010529537 | 8/2010 |

OTHER PUBLICATIONS

Chinese Office Action mailed Mar. 23, 2011 for Chinese Patent Application No. 200880018320.2, a counterpart foreign application of U.S. Appl. No. 11/756,284.

Gonzalez, et al., "Lightweight Scalable Tool Sharing for the Internet", available at least as early as Feb. 12, 2007, at <<http://doi.ieeecomputersociety.org/10.1109/ISCC.2001.935359>>, IEEE, 2001, pp. 1-2.

"Remote Desktop Protocol (RDP) Features and Performance", available at least as early as Feb 12, 2007, at <<http://www.microsoft.com/technet/prodtechnol/Win2KTS/evaluate/featfunc/rdpfperf.mspx>>, pp. 1-8.

Romano, "Application Sharing", available at least as early as Feb 12, 2007, at <<http://www.rdesktop.org/docs/t128.zip>>, pp. 1-180.

Runge, "x11vnc: a VNC server for real X displays", Jan. 12, 2007, pp. 1-57, retrieved from the internet on Nov. 30, 2010 at http://web.archive.org/web/20070112065835/http://www.karlrunge.com/x11vnc/.

European Office Action mailed Sep. 19, 2011 for European patent application No. 08756071.0, a counterpart foreign application of U.S. Appl. No. 11/756,284, 6 pages.

* cited by examiner

US 8,209,372 B2

BITMAP TRANSFER-BASED DISPLAY REMOTING

CROSS REFERENCE TO RELATED APPLICATIONS

This application is a divisional application of, and claims priority to, U.S. patent application Ser. No. 11/756,284, filed on May 31, 2007, entitled "Bitmap Transfer-Based Display Remoting," the entire disclosure of which is incorporated herein by reference.

BACKGROUND

Remote Desktop Protocol (RDP) provides remote display and input capabilities over network connections to terminal server (TS) based applications. For instance, RDP uses its own video driver on the server to render an application's display output to a client device by constructing the rendering information into network packets for communication over a network to the client. Responsive to receiving such network packets, the client decodes and interprets the rendering information into corresponding Graphical Device interface (GDI) Application Programming Interface (API) calls. (GDI is typically associated with a respective portion of an operating system). Such decoding and interpreting generally requires the client to be configured not only to decode RDP, which is an extensive interface, but also configured to map received rendering information into corresponding GDI calls. Such operations typically require the client to create and maintain multiple different data context-dependent caches to use graphical objects such as fonts, brushes, glyphs, fragments, etc., in GDI-based rendering operations. Because of the complexity of these tasks, creating a RDP-based client can be very time consuming and labor-intensive. Moreover, an RDP-based client must typically have substantial processing power to implement such operations, such processing resources is generally not found on small form factor devices. As a result, small form-factor devices are not typically used to implement a RDP-based client.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the preceding paragraph, bitmap transfer based display remoting by a server-computing device ("server") coupled to a client computing device ("client") is described. In one aspect, an application executing on the server implements operations to render a portion of a GUI. The server translates corresponding rendering-based command(s) (e.g., GDI commands, etc.) into simple bitmap transfer commands. The server sends the bitmap transfer commands to the client. For example, in one implementation the server translates a GDI command into one or more bitmap manipulation operational commands (raster operations). In one implementation, the server implements rendering operations according to the GDI command to obtain operational result(s).

The server sends the operational result(s) to the client as bitmap(s) in bitmap transfer command(s). The client, responsive to receiving bitmap transfer commands from the server, respectively stores and draws bitmap(s) from an offscreen display surface, as directed by the server, to an onscreen display surface to present the GUI portion to a user. In this manner, the server uses only bitmap transfer commands, without using or depending on any conventional RDP client-side remoting logic (e.g., cache management, determinations and processing of graphical object semantics beyond bitmap semantics, etc.), to direct and cause the client to remote the application's GUI. Such management and semantic determinations and processing are implemented and maintained respectively at and by the server.

BRIEF DESCRIPTION OF THE DRAWINGS

In the Figures and associated description, the left-most digit of a component reference number identifies the particular Figure in which the component first appears.

DETAILED DESCRIPTION

Overview

Systems and methods for bitmap transfer-based display remoting are described. The systems and methods address the limitations of conventional RDP with a simple bitmap transfer-based display remoting protocol (SBTDRP). The SBTDRP allows a server that hosts application(s) to direct and control arbitrary bitmap storing and stored bitmap display at a client to present the GUI of an application executing on the server on the client. Via this direction and control, the server abstracts what would otherwise be complex rendering and caching operations at the client into 3 way or 4 way raster operations (ROPS) between two or more surfaces at the client. The COPY ROP is an example of such operations. Whereas, conventional RDP tightly couples client-side caching of multitude of different graphical objects with rendering logic, in this implementation, only the server implements cache management logic (e.g., to map where resource bits are stored by the server to the client). These and other aspects of the systems and methods for the SBTDRP are now described in more detail.

An Exemplary System

Figure 1:
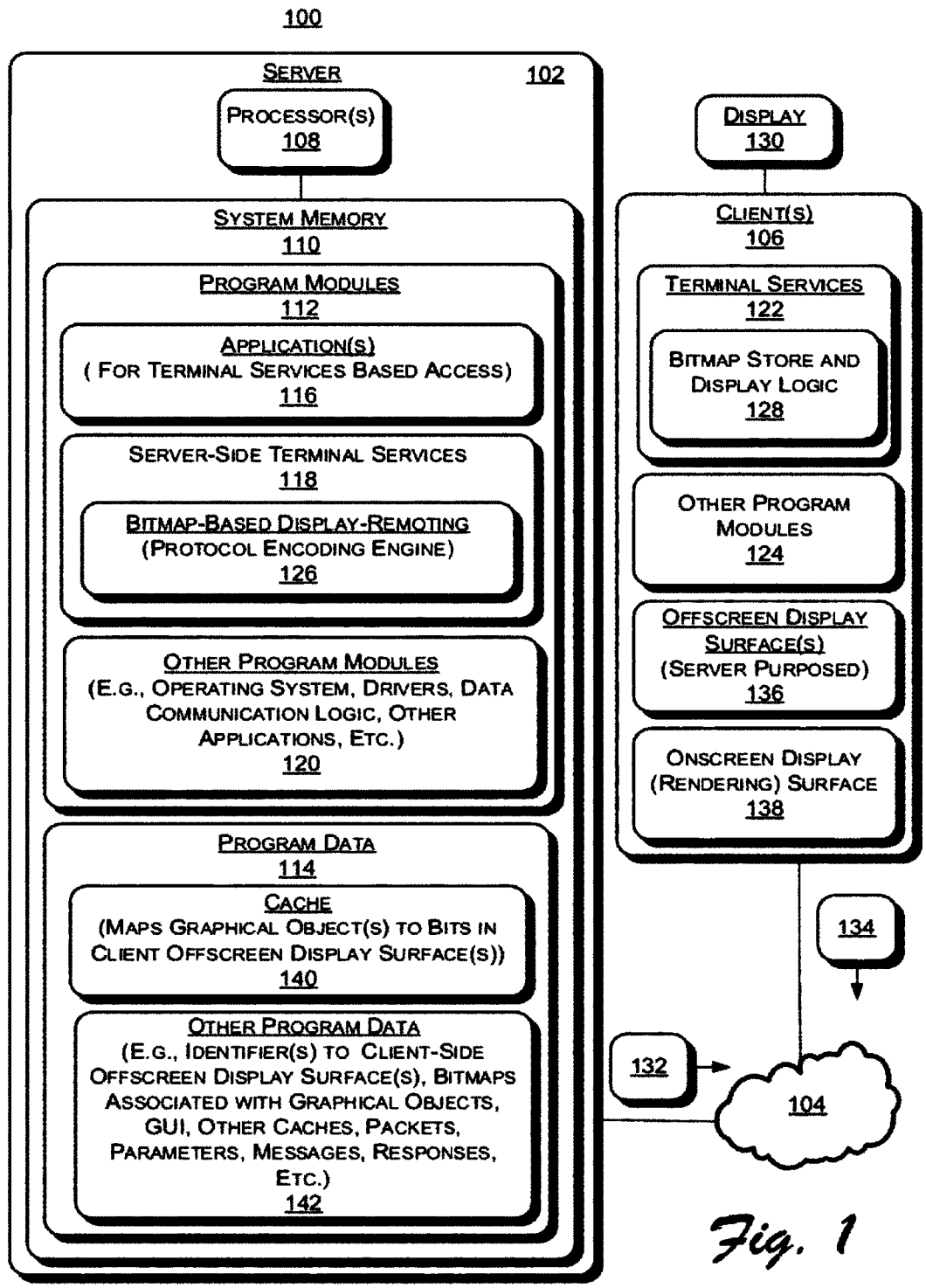
FIG. 1 shows an exemplary system for bitmap transfer-based display remoting, according to one embodiment.

FIG. 1 shows an exemplary system 100 for bitmap transfer-based display remoting, according to one embodiment. In this implementation, FIG. 1 includes, for example, a server computing device 102 ("server 102") coupled across network 104 to one or more client computing devices 106 ("client 106"). In this implementation, server 102 represents any one or more of a general-purpose computing device such as a server, a personal computer (PC), a laptop, and/or so on. Client device 106 represents any one or more of a general-purpose computing device such as a PC, a laptop computer, a mobile computing device, or any small form factor device with limited processing and data storage capabilities (e.g., a personal digital assistant (PDA), mobile device, phone, etc.) as compared to a general-purpose or server-computing device. Network 104 represents any combination of local area network (LAN) and general wide area network (WAN) communication environments, such as those commonplace in offices, enterprise-wide computer networks, intranets, and the Internet.

Each computing device 102 and 106 respectively includes one or more processors coupled to system memory comprising computer-program modules encoded thereon. The computer-program modules include instructions executable by respective ones of the processor(s). Such system memory also includes program data generated and/or used by respective ones of the computer-program instructions during program module execution. For example, server 102 includes one or more processors 108 coupled to system memory 110 representing volatile random access memory (RAM) and non-volatile read-only memory (ROM). System memory 110 includes program modules 112 comprising computer-program instructions executable by processor(s) 108. System memory 112 also includes program data 114 generated and/or used by respective ones of the program modules 112 during program module execution.

In this implementation, for example, program modules 114 include one or more arbitrary applications 116 (e.g., a word processor, an e-mail program, a spreadsheet applications, and/or so on) for terminal services-based access, server-side terminal services 118, and other program modules 120 such as an operating system to provide a runtime environment, device drivers, network communication logic, etc. In this implementation, for example, computer-program logic at client 106 includes, for example, client-based terminal services 122 and other program modules 124 such as an operating system, drivers, network communication logic, etc. Server and client terminal services 118 and 122 allow a user of client 106 to establish a terminal services session over network 104 to run one or more arbitrary applications 116 on server 102 to access any combination of files, databases, network resources, etc. Although the executing application(s) 116 run entirely on server 102, system 100 implements a simple bitmap transfer-based display remoting protocol (SBTDRP) to present elements of the GUI of the executing application(s) 116 to an end-user via display device 130.

A Simple Bitmap Transfer-Based Display Remoting Protocol (SBTDRP)

In this implementation, for example, SBTDRP is implemented by bitmap transfer-based display remoting module (or logic) 126 as part of server-side terminal services 118, and client-side bitmap store and display logic 128 as part of client-side terminal services 122. SBTDRP allows bitmap transfer-based display remoting logic 126 ("remoting logic 126") of server 102 to direct and control arbitrary bit storage and stored bit display at client 106 to present a GUI of one or more of the server-hosted executing applications(s) 116 to a user. SBTDRP obviates traditional RDP-based display remoting operations requiring a client to implement complex caching and rendering logic to implement the extensive RDP. To this end, SBTDRP abstracts conventional complex display-remoting protocols into simple server-controlled bitmap transfer (raster) operations from/to a server-purposed offscreen display surface(s) at client 106.

In this implementation, for example, SBTDRP includes the following exemplary commands 132 (interfaces or calls): CreateSurface, SetSurfaceBits, TransferSurfaceBits and DestroySurface. This set of commands 132 could be more or less in number, being a function of the particular implementation of system 100. Additionally, the particular names provided for the exemplary commands 132 are illustrative, designed to convey a respective description of operations associated with each command's respective implementation. Thus, these interfaces and their associated operations, which are described in detail immediately below, can be represented with different named interfaces.

CreateSurface( . . . )

A CreateSurface command 132 is issued by server-side remoting logic 126 to direct client-side logic 128 to allocate an offscreen display surface 136 of a particular size at a client 106 for server-purposed bitmap storage. In this implementation, for example, parameters for CreateSurface include a unique server-supplied identifier (ID) for client-side logic 128 to map to a newly created offscreen display surface 136, and a surface size. In this implementation, the surface size is expressed as a bitmap width, height and color depth (e.g., 8, 16, 24, 32 bits per pixel). The number of bytes is determined from these dimensions by both client 106 and server 102 (i.e., the number of bytes is width*height*color depth in bytes per pixels). Possible color depths can be negotiated in an initial protocol capability exchange. Responsive to receiving a CreateSurface command 132, client-side logic 128 allocates the requested surface 136 and maps the server-supplied unique surface ID to the newly allocated surface 136. As described below, remoting logic 126 utilizes this ID to refer to this specific allocated surface in subsequent commands 132.

In one implementation, for example, and using conventional messaging techniques, remoting logic 126 determines a maximum amount of memory that client 106 can utilize for caching arbitrary server-purposed bits. Based on this determination, remoting logic 126 directs client 106 to allocate at least a subset of the maximum amount of memory as an offscreen display surface 136. In this scenario, remoting logic 126 causes client 106 to allocate an offscreen display surface 136 independent of detecting and/or mapping a rendering command/call from an application 116 executing on server 102, which is in contrast to conventional RDP-based implementations.

SetSurfaceBits( . . . )

Server-side remoting logic 126 communicates a SetSurfaceBits command 132 over network 104 to client 106 to direct client-side logic 128 to store a set of bits at specific destination locations on an identified client-side offscreen display surface 136. In this implementation, for example, parameters for SetSurfaceBits include a unique ID identifying the offscreen display surface 136, the set of bits, and the destination locations for the bits. In one implementation, for example, a destination location identifies coordinates for a rectangle expressed in left, top, right, and bottom coordinates. Alternatively, a storage rectangle is identified using X, Y, width and height. In another implementation, a destination location identifies coordinates for geometrical object(s) that are not rectangles (e.g., squares, circles, arbitrary shapes, etc.).

Responsive to receiving a SetSurfaceBits command 132, client-side logic 128 stores the specified bits to the indicated destination location(s) on the designated offscreen display surface 136. As described below at paragraphs [0041] through [0043] (see also, FIG. 6), the set of bits being stored by remoting logic 126 correspond to bits describing a graphical object that may subsequently be used by rendering logic 126 to render one or more aspects of a GUI of an application 116 executing on server 102. From the perspective of the client 106, however, and independent of being bitmap bits, the meaning or semantics of these stored bits is of no significance; the bitmap has arbitrary meaning and are merely stored onto the offscreen display surface 136 by client-side logic 128 as directed by server 102.

TransferSurfaceBits( . . . )

Remoting logic 126 uses the TransferSurfaceBits command 132 to direct client-side logic 128 to transfer specific bit(s) cached in a particular client-side offscreen display surface 136 into a different surface (e.g., an on-screen rendered surface 138, another offscreen surface, etc.) for presentation by client 106 via display device 130. In this implementation, for example, parameters for the TransferSurfaceBits include one or more of the following:

- A unique source surface ID identifying a particular offscreen display surface 136.
- A destination surface ID to identify a destination surface (e.g., an on-screen display surface) for a target bitmap.
- A source rectangle (or other arbitrary shape) identifying a set of bits representing a target bitmap to transfer to the identified destination surface.
- A destination rectangle (or other arbitrary shape such as a clip region) in the destination surface to receive the transferred bitmap. In one implementation, the TransferSurfaceBits command 132 includes a clipping" region (a set of rectangles that define an irregular area in the destination) for updating.
- A mask bitmap (or surface). For example, a MaskBlt is a bitmap transfer operation through which pixels are transferred from the source surface to the destination selectively based on the value of the corresponding pixel in the mask. For example, a pixel at the 100,100 coordinate is transferred from the source to the destination only if the pixel at the 100,100 coordinate in the mask bitmap is set to 0 (black).
- An indication of a raster operation (i.e., copy, xor, etc.) for client logic 128 to implement the bitmap transfer from the source surface to the destination surface. In one implementation, for example, the TransferSurfaceBits command 132 directs client logic 128 to implement a mask surface operation.

In one implementation, failure by client-side logic 128 to transfer the bitmap causes client logic 128 to communicate a generic "dirty" surface notification 134 to remoting logic 126, and thereby, notify remoting logic 126 that the surface bits are not valid. In one implementation, and responsive to such notification, server 102 sends updates to client logic 128 for the invalid surface bits/region (the updates will make the region valid).

DestroySurface( . . . )

Remoting logic 126 sends a DestroySurface command 132 to direct client-side logic 128 to destroy (de-allocate) a server 102 initiated and purposed offscreen display surface 136. In this implementation, parameters for DeleteSurface include, for example, a unique surface ID to a particular offscreen display surface 136.

Exemplary Server Purposed Bitmap Storing and Transfer

The following examples compare and contrast use of conventional RDP to display an element of a GUI of an application executing on a TS-based server on a TS-based client, to the use of SBTDRP. These examples are illustrative and other sequences of operations, graphical objects, surfaces, and/or so on, can be substituted without straying from these examples.

Using conventional RDP-based logic, the following operations are typically required to cache a brush object to a particular location and use the brush object to fill a rectangle in a primary on-screen display surface. For purposes of exemplary illustration, the brush is a 16×16 pixel brush, and the rendering location on the on-screen display surface is (0, 0, 64, 16), Representing a surface area encapsulating multiple such brushes.

- Negotiate, between the server ("S") and the client ("C") as part of initial protocol exchange, cache types (e.g., brush, glyph, font, fragment, bitmap, etc.) and sizes so the client can set up complex cache management services that tightly couple cache management operations with graphical object rendering operations. In this example, the cache type is a brush cache. Cache sizes include, for example, a 16 (width)×16 (height) cache with 100 entries, 42×32 cache with 200 entries, etc.
- Server gets the bitmap bits and origin for the brush it sends them to the client for caching at some specified position (e.g., position 99) in the brush cache.
- The server instructs the client to use the brush in brush cache position 99 to fill the surface rectangle at (0, 0, 64, 16) on the on-screen display surface. Client responds by converting the RDP command to a corresponding GDI call that uses the cached brush. Client submits the GDI call to an operating system of Client to draw the brush as directed. Given the size of the surface rectangle in the size of the brush (16×16), GDI at the client will iteratively perform multiple brush rendering commands to fill in the surface rectangle.

In contrast to the above example, system 100 of FIG. 1 utilizes SBTDRP to store a bitmap of the brush onto an offscreen display surface at the client and multiple server-initiated bitmap copy commands (one command at a time—serially) to fill in a rectangle on on-screen display surface at client 106. Thus, the server decomposes, or breaks a more complex rendering command from the application 116 (e.g., a GDI command), into simpler bitmap transfer commands. One distinction between caching and storing in this context is that to cache an object at client using RDP, the RDP-based client requires cache management logic to perform the cache operation and to perform the object transfer. In contrast, bitmap storage and bitmap transfer on client 102 is completely independent of any cache management at client 102.

For purposes of exemplary illustration and comparison, the brush size is 16×16 bits, coordinates of the surface rectangle on the on-screen display surface (e.g., "surface 0") at client 106 are (0, 0, 64, 16). As in the immediately preceding example, it would take multiple rendering operations to fill in the target surface rectangle. Please note that in the previous example, the client used GDI to convert the server command into multiple rendering operations to fill in the surface rectangle. In contrast, server 102 iteratively communicates multiple transfer surface bit commands to the client 102 to perform the exemplary rendering operation.

Figure 2:
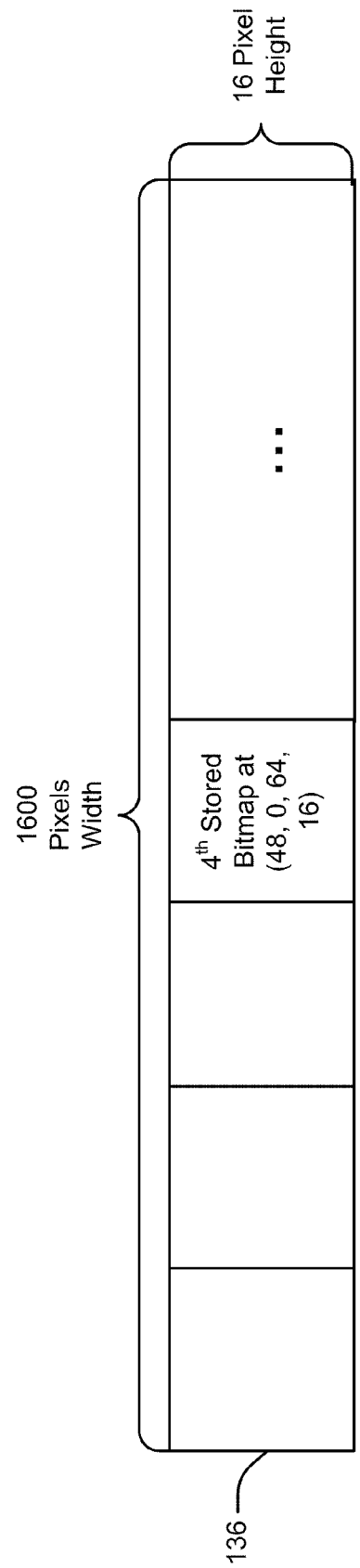
FIG. 2 shows an exemplary server created and purposed offscreen display surface at a remote client for bitmap transfer-based display remoting, according to one embodiment.

- Remoting logic 126 and client-side logic 128 negotiate and allocate an offscreen display surface 136 (e.g., as part of the initial protocol operations). For purposes of exemplary illustration, such an offscreen display surface is shown in FIG. 2.
- Remoting logic 126 instructs client 106 to create an offscreen surface 136 mapped to a server-supplied (and maintained) unique identifier (e.g., ID 88). In one implementation, the offscreen surface is at least 16×16.

Remoting logic 126 instructs client 106 to set bitmap bits (via SetSurfaceBits command 132) at the (0, 0, 16, 16) location in surface ID 88 to specific bitmap bits representing the brush object.

Remoting logic 126 instructs client 106 to transfer the bits (via TransferSurfaceBits command 132) from surface ID 88 at location (0, 0, 16, 16) to surface 0 at location (0, 0, 16, 16).

Remoting logic 126 instructs client 106 to transfer the bits from offscreen display surface ID 88 at location (0, 0, 16, 16) to surface 0 at (16, 0, 42, 16).

Remoting logic 126 instructs client 106 to transfer the bits from offscreen display surface ID 88 and location (0, 0, 16, 16) to surface 0 at (32, 0, 58, 16).

Remoting logic 126 instructs client 106 to transfer the bits from surface 88 (0, 0, 16, 16) to surface 0 at (48, 0, 64, 16).

Referring to the immediately preceding example using SBTDRP, please note that remoting logic 126 iteratively implements the transfer surface bits command 132 (in this example, four times) to fill the specified destination rectangle with the specified brush bitmap. In contrast to conventional systems, the simplified protocol implemented by system 100, uses the simple SBTDRP commands for bitmap and brush handling (as well as all other operations utilized to display a GUI from an application 116 executing at server 102 onto a display device 132 coupled to a remote client 106). As a result, client 106 is configured to implement simple bitmap/surface read and write manipulations to render respective portions of a GUI associated with an application 116 executing a server 102. That is, server 102 breaks down complex graphic rendering commands (e.g., like FillRect GDI commands, etc.) into individual corresponding bitmap raster operations commands. This is in contrast to conventional RDP systems, where a client is configured to maintain multiple different graphical object specific caches, understand semantic differences between various graphical objects (e.g., glyphs, brushes, bitmaps, etc.), and often convert RDP rendering commands into corresponding GDI commands (e.g., to fill in a rectangle with a brush from a brush cache).

Exemplary Procedures

Figure 3:
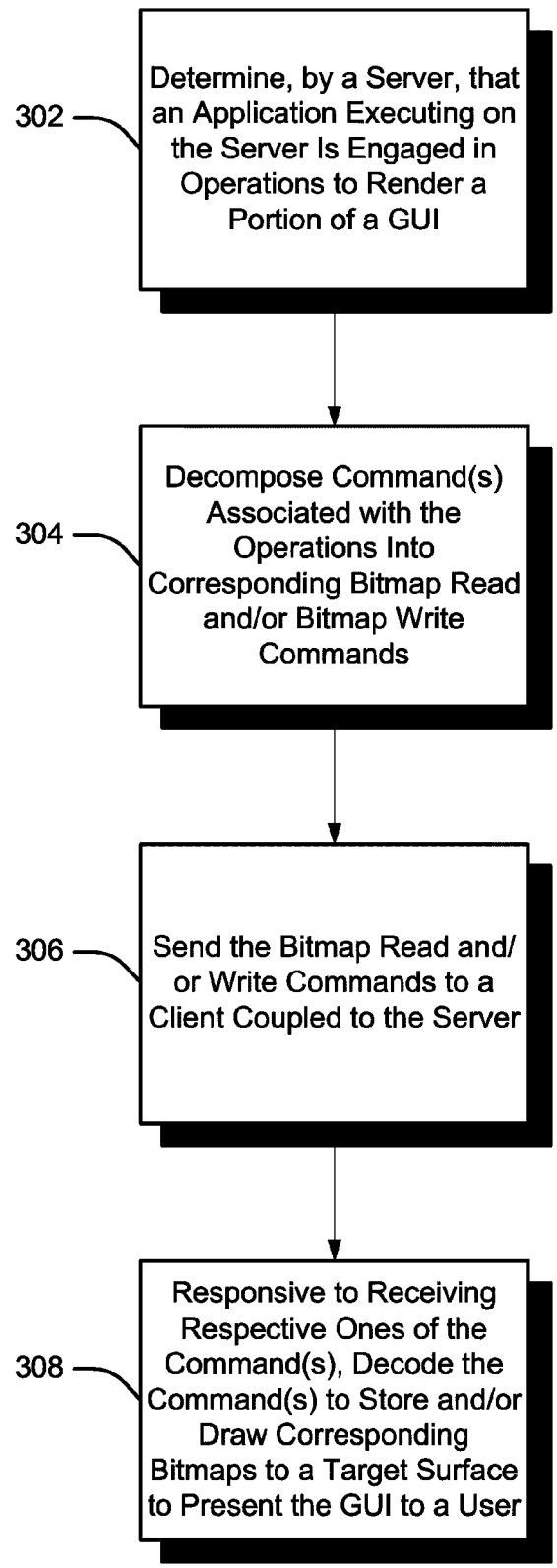
FIG. 3 shows an exemplary procedure for bitmap transfer-based display remoting, according to one embodiment.

FIG. 3 shows an exemplary procedure 300 for bitmap transfer-based display remoting, according to one embodiment. For purposes of exemplary illustration and description, the operations of procedure 300 are described with respect to aspects and components of FIG. 1. In the description, the left-most numeral of a component reference number indicates the particular figure where the component was first introduced. Referring to FIG. 3, operations at block 302 determine, by server remoting module 126 (FIG. 1), that an application 116 executing on the server 102 is engaged in an operation to render a portion of the application's GUI. Such operations include, for example, creating graphical objects such as brushes, glyphs, fonts, fragments, etc., for subsequent use to render the GUI. In another example, such operations include actual rendering commands such as brush fill commands, etc. Operations of block 304 decompose, or break-up commands associated with the operations (e.g., please see block 302) into corresponding bitmap raster operations commands.

For example, and as described above, if application 116 generates a GDI command to create a brush graphical object, server remoting logic 126 writes a bitmap to a particular offscreen display surface of 136 at client 106. In another example, if the application 116 utilizes the brush graphical object to fill in a portion of the GUI, server remoting logic 126 directs client 106 (one or more times) to transfer the bitmap corresponding to the brush to a particular portion of onscreen display surface 138 to present the GUI portion to user. Such transfer operations include bitmap read and write operations.

Operations of block 306 send the bitmap raster operations commands (please see operations of block 304) to client 106. Operations of block 308 decode, by client 106, the received bitmap raster operations commands to respectively store and/or draw corresponding bitmaps to onscreen display surface 138 to present the GUI portion to a user. In one implementation, the commands may direct client 106 to transfer bitmaps(s) from one offscreen surface to another offscreen surface before transferring bitmap(s) to an onscreen surface. Logic at client 106 to store and draw bitmaps to present the GUI portion is/are completely independent of client-implemented cache management logic. Moreover, the client logic is completely independent of any determination and processing of graphical object semantics beyond bitmap semantics. This is in contrast to conventional RDP operations.

Figure 4:
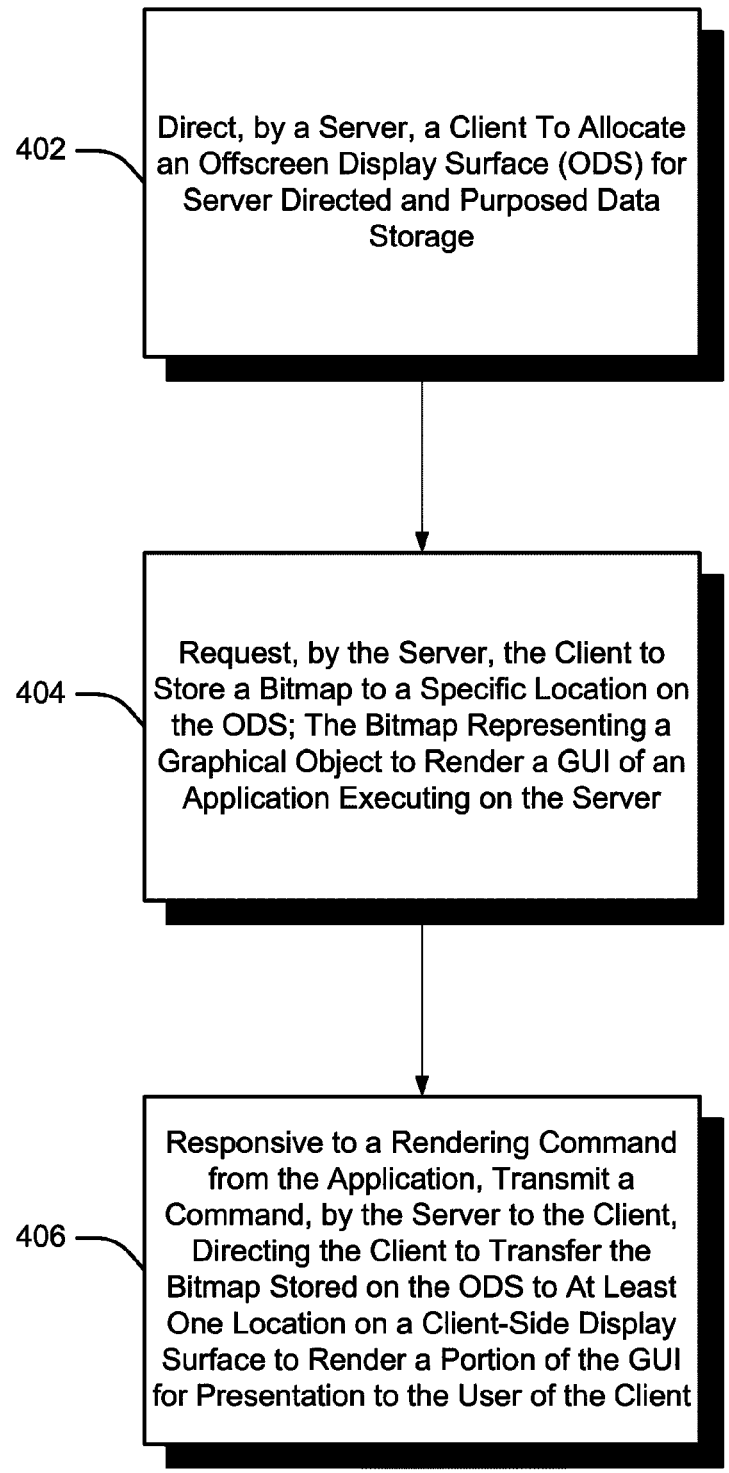
FIG. 4 shows an exemplary procedure for bitmap transfer-based display remoting, according to one embodiment.

FIG. 4 shows an exemplary procedure 400 for bitmap transfer-based display remoting, according to one embodiment. For purposes of exemplary illustration and description, the operations of procedure 400 are described with respect to aspects and components of FIG. 1. In the description, the left-most numeral of a component reference number indicates the particular figure where the component was first introduced. Referring to FIG. 4, operations at block 402 direct, by a server, a client to allocate an offscreen display surface for server directed and purposed data storage. In one implementation, remoting logic 126 at server 102 directs client-side logic 128 of client 106 to allocate an offscreen display surface 136 for such server directed and purposed data storage using a CreatesSurface command 132. This server-directed and purposed data storage is to present a GUI of an application 115 executing at the server 102 to a user of the client 106 (e.g., via display device 130).

Operations of block 404 request, by the server, the client to store a bitmap to a specific location on the offscreen display surface. In one implementation, for example, this operation is made responsive to the application requesting a GDI or other graphical interface to create or modify a graphical object (e.g., brush, glyph, bitmap, font, etc.) to render the GUI on the server. In one implementation, rendering logic 126 intercepts calls from the application 116 to the GDI. In another implementation, for example, this operation is performed independent of a request to the GDI. For example, the operation can be performed responsive to the client being requested to display something other than GDI output (e.g., a black rectangle, etc.), and/or so on. When such a call is associated with creating or modifying a graphical object for rendering the GUI, rendering logic 126 requests client-side logic to store an arbitrary bitmap representing the graphical object to a specific location on the allocated offscreen display surface 136. Such a request is made for example, by rendering logic 126 communicating a SetSurfaceBits command 132 to client-side logic 128.

Operations of block 406 are responsive to the server intercepting a rendering command from the application, wherein the rendering command is associated with a previously created graphical object (e.g., a brush, a glyph, etc.). (Techniques such as mirror drivers, etc., to intercept rendering commands from specific applications are known). Specifically, operations of block 406 cause the server to transmit a command to the client to direct the client to transfer a bitmap corresponding to the previously created graphical object from the offscreen display surface to at least one location on a client-side display surface. These operations result in rendering a portion of the GUI for presentation to a user of the client. In one implementation, for example, operations at block 406 are implemented by rendering logic 126 communicating a TransferSurfaceBits command 132 to client-side logic 128. Receipt of this command by client-side logic 128 causes client-side logic 128 to transfer of the server-specified bitmap to a destination location on a different display surface (e.g., an on-screen rendered surface 138). These arbitrary bitmap transfer operations by client-side logic 128 result in a portion of the GUI of application 116, which is executing on server 102, to be presented to a user of the client 106. These and further details of exemplary procedures for bitmap transfer-based display remoting are now described in more detail with respect to FIGS. 4 through 7.

Figure 5:
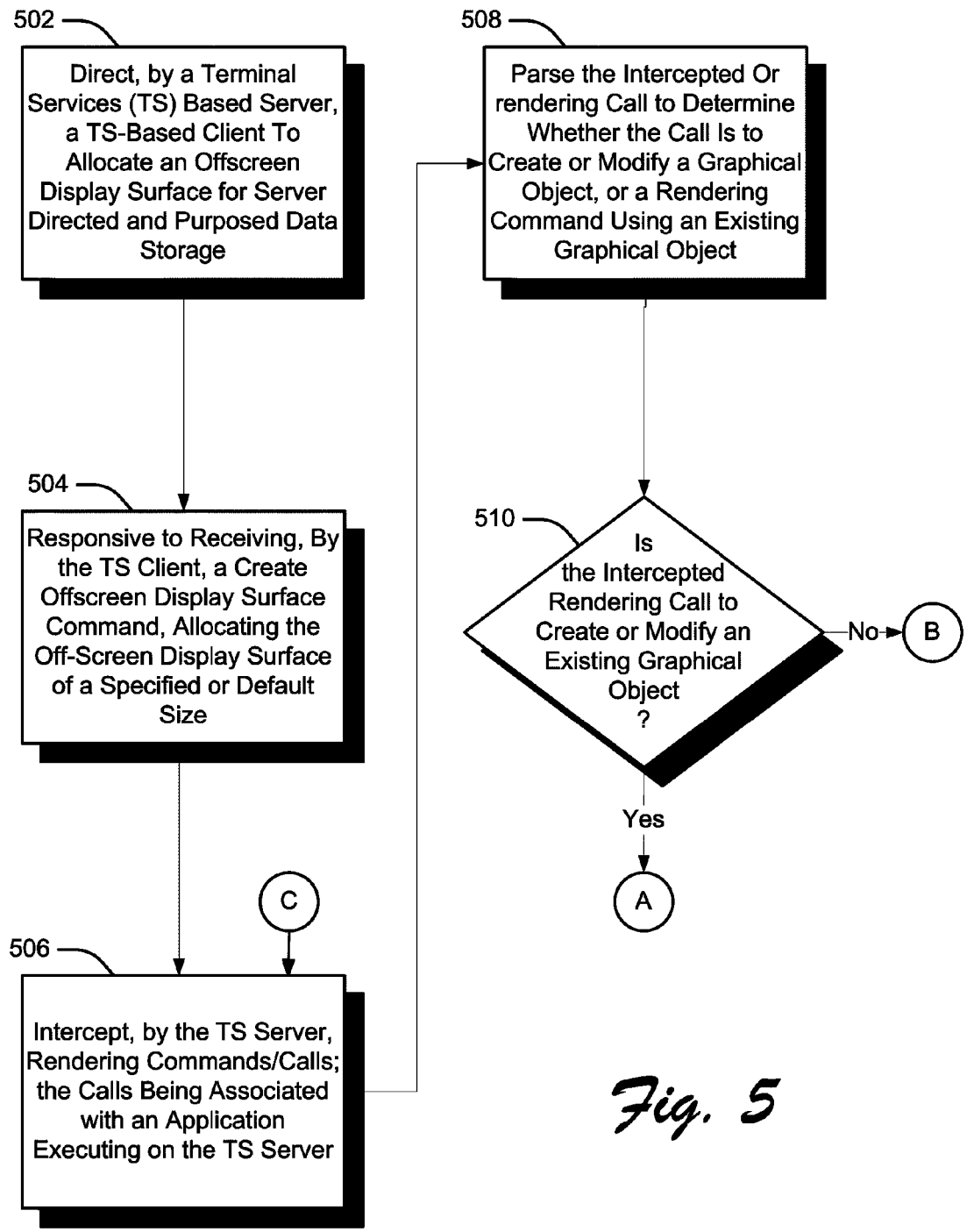
FIG. 5 shows another exemplary procedure for bitmap transfer-based display remoting, according to one embodiment.

FIG. 5 shows another exemplary procedure 500 for creating an offscreen display surface at a remote client device for bitmap transfer-based display remoting, according to one embodiment. For purposes of exemplary illustration and description, the operations of procedure 500 are described with respect to aspects and components of FIG. 1. In the description, the left-most numeral of a component reference number indicates the particular figure where the component was first introduced.

Referring to FIG. 5, operations of block 502 direct, by a server, a client to allocate an offscreen display surface of a specific size for server directed and purposed bitmap storage operations. This direction does not include any information indicating to client 102 that the requested surface will be used for bitmap or any other data storage. In one implementation, for example, remoting logic 126 of server 102 requests client-side logic 128 to indicate a size (e.g., maximum, default, or otherwise) that the client 106 can allocate for an offscreen display surface 136. Responsive to determining the size, remoting logic 126 sends a CreateSurface command 132 to client 106. The CreateSurface command 132 directs client-side logic 128 to allocate an offscreen display surface 136 of the indicated size. This communication also includes a server-supplied unique ID for the client-side logic 128 to associate with the newly allocated offscreen display surface 136. As described below, remoting logic 126 will use this unique ID when directing client-side logic 128 to perform bitmap-based operations associated with this particular offscreen display surface 136. In one implementation, operations of block 502 are implemented by remoting logic 126 and client-side logic 128 as part of initial protocol configuration operations. Operations of block 504, responsive to receiving (by client 106) a command 132 to create an offscreen display surface 136, client 106 allocates the offscreen display surface 136 of a particular specified or default size.

Operations of block 506 intercept rendering commands (e.g., calls to a GDI) to present a GUI of an executing terminal services-based application. In one implementation, for example, remoting logic 126 utilizes a conventional driver to intercept rendering calls from an executing application 116 (e.g., to GDI logic, etc.) to present a GUI associated with executing application 116. Operations of block 508 determine whether the intercepted rendering command (or rendering associated command) is to create or modify (including a delete/destroy command) a graphical object (e.g., a brush, glyph, fragment, bitmap, font, etc.), or whether the intercepted rendering command is a command to use a particular graphical object to perform a rendering operation (e.g., a fill command, a draw operation, etc.). In one implementation, remoting logic 128 makes this determination by parsing the command using known rendering command parsing techniques (e.g., GDI command parsing techniques, etc.). At block 510, if the intercepted rendering command/call is directed to creating or modifying an existing graphical object, operations of procedure 500 continue at block 602 of FIG. 6, as indicated by a on-page reference "A". Otherwise, if the intercepted rendering call is directed to utilizing a particular graphical object to implement a rendering operation, operations of procedure 500 continue at block 702 of page 7 as indicated by a one-page reference "B". In one implementation, the operations of block 510 are implemented by remoting logic 126 of server 102.

Figure 6:
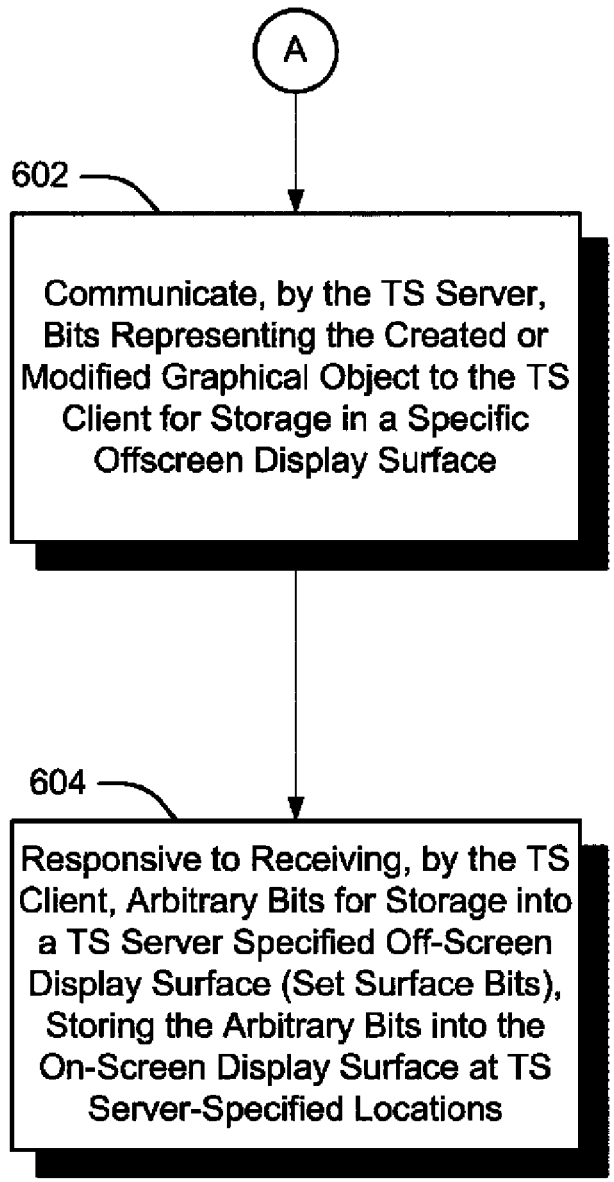
FIG. 6 shows further aspects of the exemplary procedure of FIG. 5 for bitmap transfer-based display remoting, according to one embodiment.

FIG. 6 shows further aspects of the exemplary procedure for bitmap transfer-based display remoting, according to one embodiment. In particular, FIG. 6 is a continuation of the procedure 500 of FIG. 5. Referring to FIG. 6, operations begin at block 602, as indicated by a on-page reference "A". Operations of block 602 are implemented responsive to the previous determination that an intercepted rendering command is to create or modify an existing graphical object (please refer to FIG. 5, block 510). At block 602, the server communicates bits representing the created or modified graphical object to the client for caching at specific locations on a specific offscreen display surface. In one implementation, remoting logic 126 uses a SetSurfaceBits command 132 to communicate bits representing a created or modified graphical object to client-side logic 128 for caching by client-side logic 128 at server-specified locations on a server-identified offscreen display surface 136. For purposes of exemplary illustration, such bits are shown as respective portion of "other program data" 142 of FIG. 1.

In one implementation, for example, created or modified graphical object bits in a SetSurfaceBits command 132 indicate, for example, bitmap size, color, compression, and/or so on. Operations to send these bits to the client 106 are completely independent of sending any indication to client 106 of corresponding bit definition or context of the bits. Additionally, the specific offscreen display surface 136 specified in the SetSurfaceBits command 132 is a surface 136 that remoting logic 126 identifies with a unique ID. Please recall that in this implementation, remoting logic 126 supplied this unique ID to client-side logic 128 when the surface 136 was created via CreateSurface command 132.

Operations of block 604, responsive to receiving a set surface bits command, stores arbitrary bits (arbitrary from the perspective of client 106 and client-logic 128) associated with the set surface bits command into a specified offscreen display surface. In one implementation, for example, client-side logic 128, responsive to receiving a SetSurfaceBits command 132, stores the associated arbitrary bits into the specified offscreen display surface 136 at server-specified locations on the surface 136. In this scenario, client 106 is configured to understand that the communicated bits represent a bitmap, and the SetSurfaceBits command 132 requests a corresponding bitmap copy or transfer operation. Other than this, the configuration of client 106 is completely independent of any need to determine a definition, context, semantics, etc. for the bits communicated in the SetSurfaceBits command 132. From the perspective of client 106, the received bits merely represent an arbitrary bitmap of unknown semantics being stored at client 106 by remoting logic 126. Thus, client 106 caches the received bits independent of determining any graphical object-based semantic. Exemplary determinations of graphical object-based semantics include, for example, logic to determine answers to questions such as do received bits represent a graphical object of some type, and if so, what type of graphical object? For instance, do the bits represent a brush, a bitmap, a glyph, a fragment, etc. Conventional RDP client implementations perform special processing based on the determined type of graphical object.

Figure 7:
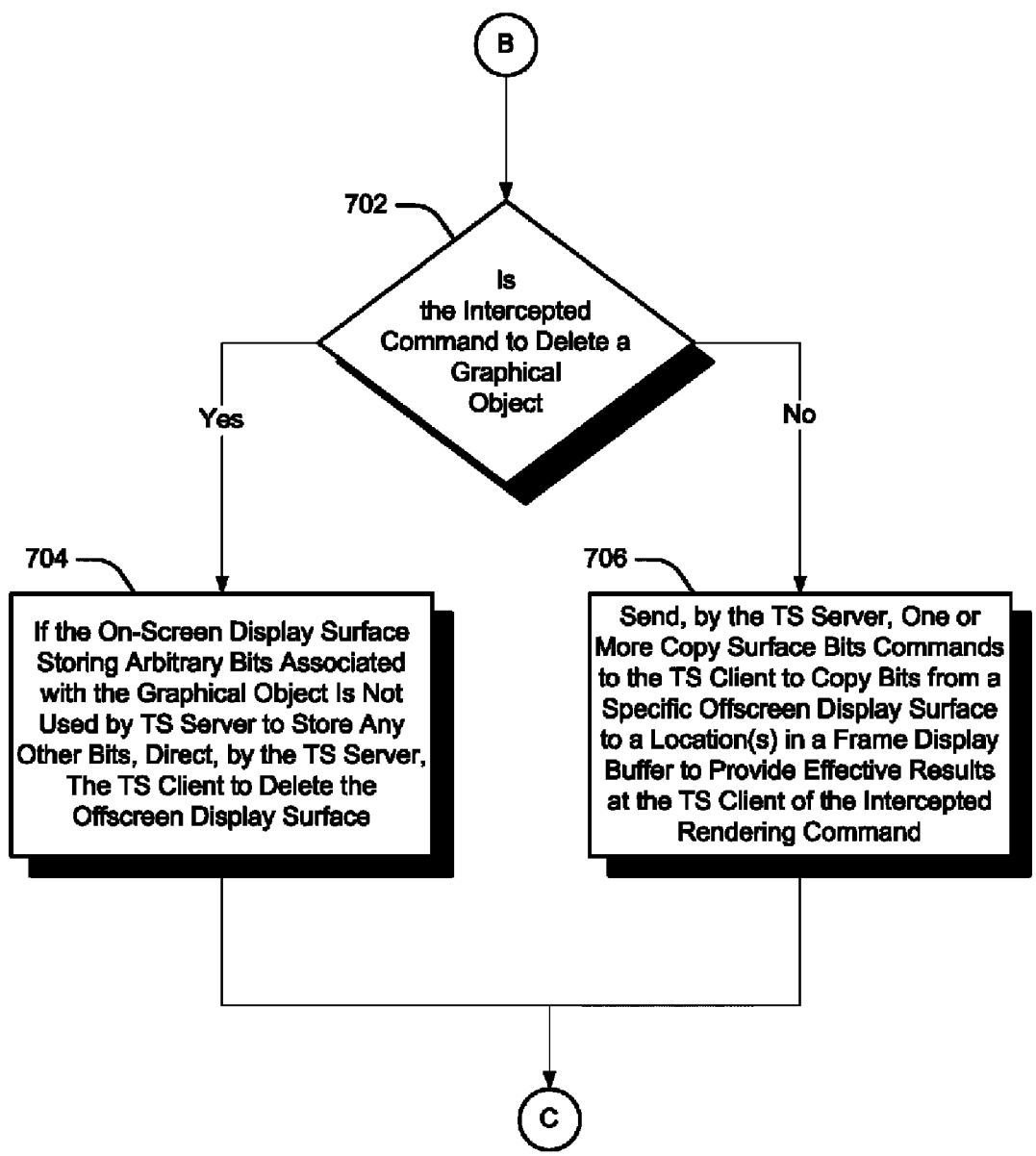
FIG. 7 shows further aspects of the exemplary procedure of FIGS. 5 and 6 for bitmap transfer-based display remoting, according to one embodiment.

FIG. 7 shows further aspects of the exemplary procedure 500 for bitmap transfer-based display remoting, according to one embodiment. In particular, FIG. 7 is a continuation of the procedure 500 of FIGS. 5 and 6 (please refer to a one-page reference "B" on FIG. 5. Referring to FIG. 7, operations begin at block 702 responsive to a previous determination that an intercepted call was not a rendering call to create or modify an existing graphical object (please refer to FIG. 5, block 510). Thus, the intercepted call was to delete an existing graphical object, or a rendering command.

Operations of block 702 determine whether the intercepted call was a call to delete a graphical object. If so, operations continue at block 704, where it is determined whether the server has any need to maintain bits in a client-side a screen display surface. Such a determination is arbitrary and based on the particular implementation of server-side remoting logic 126. For example, in one implementation, server-side remoting logic evaluates local cache 142 to determine whether a client-side-offscreen display surface 136 associated with the graphical object identified in the call is still useful. Such a determination can be made based on many different arbitrary parameters based on the particular implementation of server-side remoting logic 126.

For instance, if the graphical object scheduled by the call for deletion at the server-side is the only object with corresponding bits cached in the client-side on-screen display surface 136, remoting logic 126 may decide to overwrite the corresponding bits with any subsequent cached bits, or may request client-side logic 128 to delete the surface 136. In another example, consider that remoting logic 126 utilizes one or more offscreen surfaces 136 to cache brushes. When a brush is deleted at server 102 via GDI, remoting logic 126 may determine to re-purpose the area occupied by the corresponding bitmap cached on a surface at client 106 (i.e., the surface bits can be used for something else). Note that the brush bits area on the client-side can be managed as one surface per brush, or multiple bitmaps representing brushes on a same surface 136, as described in the preceding example. Thus, and in one implementation, remoting logic 126 may not delete a surface 136, but merely repurpose at least a portion of the associated surface bits.

In view of the above, and if deletion of the surface 136 is dictated, operations of block 704 cause remoting logic 126 to communicate a DeleteSurface command 132 directing client-side logic 128 to delete the particular offscreen display surface 136. Responsive to receiveing sucha a command 132, client-side logic de-allocates (destroys) the identified offscreen display surface 136.

If operations of block 702 determine that the intercepted call was not a call to delete a graphical object, then the call is associated with using a specific graphical object to implement a rendering operation (e.g., a draw command, a fill command, etc.). Thus, operations of procedure 500 continue at block 706. At block 706, a server sends one or more transfer surface bits commands to a client to copy bits from a specific offscreen display surface to locations in a frame display buffer to provide effective results at the client of the intercepted GDI rendering command. In one implementation, for example, rendering logic 126 sends one or more TransferSurfaceBits commands 132 to client-side logic 128 to copy bits from a specific surface 136 to locations in a frame display buffer to provide effective results at client 106 of the intercepted rendering command. The particular bits being copied represented the bits previously cached by rendering logic 126 into the specific offscreen display surface 136. In one implementation, remoting logic 126 maps graphical objects at server 102 to specific client-side on-screen display surfaces 136 (via the unique surface IDs), and corresponding source locations at surface 136, using server-side cache 140.

Conclusion

Although the above sections describe bitmap transfer-based display remoting in language specific to structural features and/or methodological operations or actions, the implementations defined in the appended claims are not necessarily limited to the specific features or actions described. For example, although operations of procedure 500 (please refer to FIGS. 5-6) are shown with a particular flow and sequential ordering, these operations are exemplary and meant only to be illustrative of one illustrative and exemplary implementation of system 100. For instance, although operations to create a client-side off screen display surface 136 are described with respect to block 502 of procedure 500, remoting logic 126 can create as many such offscreen display surfaces 136 as per its particular implementation. For instance, after operations of block 506, where a rendering associated call is intercepted, another implementation of rendering logic 126 may create another such offscreen display surface 136 (as described with respect to blocks 502 and 504) to cache bits for a corresponding graphical object. In view of this, procedures 400 and 500 are examples of the many different arbitrary operational flows that could be taken by a particular implementation of system 100. Thus, the specific features and operations for bitmap transfer-based display remoting described above are exemplary forms of implementing the claimed subject matter.

The invention claimed is:

1. In a system comprising a server computing device ("server") coupled over a network to a client computing device ("client"), a method implemented by the server comprising:
  intercepting commands associated with rendering from an application executing on the server;
  if the commands are to create or modify a graphical object associated with rendering operations:
    causing the client, independent of any client-side display remoting cache management and processing, to write a bitmap representing the graphical object to a specified location on an offscreen display surface at the client; and
    caching the graphical object along with indications of the offscreen display surface and the specified location;
  if the rendering command specifies use of the graphical object to render a portion of a graphical user interface (GUI) of the application at the server:
    serially, one or more times, directing the client to transfer the bitmap, independent of client-side display remoting cache management and processing, from the specified location to one or more destination locations on an onscreen display surface at the client to present the portion to a user.

2. The method of claim 1, wherein the server is a Remote Desktop Protocol (RDP) server and the client is an RDP client.

3. The method of claim 1, wherein a command of the commands is a call to a graphical device interface.

4. The method of claim 1, wherein, the bitmap is smaller than the portion, wherein each of the one or more destination locations represents a different position for transferred bits of the bitmap, and wherein transferring the bitmap further comprises iteratively directing the client to copy the bitmap to respective parts of the portion until the portion has been completely rendered.

5. The method of claim 1, wherein the method further comprises, if the command is to delete the graphical object, reusing the specific location on the offscreen display surface to cache a different bitmap associated with a different graphical object associated with a rendering call from the application.

6. The method of claim 1, wherein the method further comprises, if the command is to delete the graphical object, de-allocating the offscreen display surface.

7. The method of claim 1, wherein the method further comprises:
determining a size for the offscreen display surface; and
allocating the offscreen display surface.

8. The method of claim 7, wherein allocating the offscreen display surface is part of a set of initial configuration operations.

9. A memory comprising computer-program instructions executable by a processor that, when executed, instruct the processor to perform acts comprising:
intercepting commands associated with rendering from an application executing on a server;
if the commands are to create or modify a graphical object associated with rendering operations:
causing a client to write a bitmap representing the graphical object to a specified location; and
caching the graphical object along with an indication of the specified location;
if the rendering command specifies use of the graphical object to render a portion of a graphical user interface (GUI) of the application at the server:
directing the client to transfer the bitmap from the specified location to one or more destination locations representing different positions for transferred bits of the bitmap at the client to present the portion to a user; and
iteratively directing the client to copy the bitmap to respective parts of the portion of the GUI until the portion of the GUI is completely rendered.

10. The memory of claim 9, wherein the server is a Remote Desktop Protocol (RDP) server and the client is an RDP client.

11. The memory of claim 9, wherein a command of the commands is a call to a graphical device interface.

12. The memory of claim 9, wherein, the bitmap is smaller than the portion of the GUI.

13. The memory of claim 9, wherein the specified location is on an offscreen display surface at the client, the offscreen display surface cached along with the graphical object and the indication of the specified location; and
wherein the one or more destination locations are on an onscreen display surface at the client.

14. The memory of claim 13, wherein the memory instructs the processor to perform further acts comprising:
if the command is to delete the graphical object, reusing the specific location on the offscreen display surface to cache a different bitmap associated with a different graphical object associated with a rendering call from the application.

15. The memory of claim 13, wherein the memory instructs the processor to perform further acts comprising:
if the command is to delete the graphical object, de-allocating the offscreen display surface.

16. The memory of claim 13, wherein the memory instructs the processor to perform further acts comprising:
determining a size for the offscreen display surface; and
allocating the offscreen display surface.

17. The memory of claim 13, wherein allocating the offscreen display surface is part of a set of initial configuration operations.

18. A computing device comprising:
a cache and;
a bitmap transfer-based display remoting module configured to:
intercept commands associated with rendering from an application executing on the computing device;
if the commands are to create or modify a graphical object associated with rendering operations:
cause an other computing device independent of any client-side display remoting cache management and processing, to write a bitmap representing the graphical object to a specified location at the other computing device; and
cache the graphical object along with indications of the specified location in the cache;
if the rendering command specifies use of the graphical object to render a portion of a graphical user interface (GUI) of the application at the computing device:
serially, one or more times, direct the other computing device to transfer the bitmap, independent of display remoting cache management and processing at the other computing device, from the specified location to one or more destination locations representing different positions for transferred bits of the bitmap on an onscreen display surface at the other computing device, wherein the bitmap is smaller than the portion of the GUI and wherein transferring the bitmap further comprises iteratively directing the client to copy the bitmap to respective parts of the portion until the portion of the GUI has been completely rendered.

19. The computing device of claim 18, wherein the bitmap transfer-based display remoting module is configured to:
if the command is to delete the graphical object, reuse the specific location to cache a different bitmap associated with a different graphical object associated with a rendering call from the application.

20. The computing device of claim 18, wherein the computing device is a server and the other computing device is a client.

* * * * *

UNITED STATES PATENT AND TRADEMARK OFFICE
CERTIFICATE OF CORRECTION

PATENT NO.        : 8,209,372 B2                                              Page 1 of 1
APPLICATION NO.   : 13/149010
DATED             : June 26, 2012
INVENTOR(S)       : Abdo et al.

It is certified that error appears in the above-identified patent and that said Letters Patent is hereby corrected as shown below:

In column 14, line 42, in Claim 18, before "until" insert -- of the GUI --.

Signed and Sealed this
First Day of January, 2013

David J. Kappos
*Director of the United States Patent and Trademark Office*